United States Patent
Nagao

[11] Patent Number: 6,029,537
[45] Date of Patent: Feb. 29, 2000

[54] MULTI DIRECTIONAL SHIFT MECHANISM

[75] Inventor: Hirofumi Nagao, Kobe, Japan

[73] Assignee: Konami Co., Ltd., Hyogo-ken, Japan

[21] Appl. No.: 09/071,407

[22] Filed: May 1, 1998

[30] Foreign Application Priority Data

May 8, 1997 [JP] Japan .................................. 9-118027

[51] Int. Cl.[7] .............................. B05G 9/00; B05G 9/047
[52] U.S. Cl. ................................... 74/473.33; 74/471 XY; 273/148 B
[58] Field of Search ........................ 74/471 XY, 473.25, 74/473.26, 473.28, 473.33, 473.36, 518, 526, 528, 527; 273/148 B

[56] References Cited

U.S. PATENT DOCUMENTS

| | | | |
|---|---|---|---|
| 4,583,417 | 4/1986 | Hurlow | 74/473.15 |
| 4,825,157 | 4/1989 | Mikan | 74/471 XY X |
| 4,857,881 | 8/1989 | Hayes | 74/471 XY X |
| 4,926,172 | 5/1990 | Gorsek | 273/148 B X |
| 5,184,523 | 2/1993 | Nyzedatny | 74/471 XY |
| 5,287,743 | 2/1994 | Doolottle et al. | 74/471 XY |
| 5,655,411 | 8/1997 | Avitan et al. | 74/471 XY |
| 5,749,268 | 5/1998 | Nishimura | 74/471 XY X |
| 5,875,682 | 3/1999 | Smith | 74/471 XY |
| 5,921,141 | 7/1999 | Gouselis | 74/473.33 |

*Primary Examiner*—David A. Bucci
*Assistant Examiner*—Brandon C. Stallman
*Attorney, Agent, or Firm*—Jordan and Hamburg LLP

[57] ABSTRACT

This invention relates to a shift lever mechanism used in driving a simulative running machine. The shift lever mechanism has a first shaft extending along a first axis and a second shaft extending along a second axis orthogonal to the first axis. An operation lever is pivotable about the first axis and the second axis. The shift lever mechanism further includes a speed zone setter for variably setting a speed of the running machine among a plurality of speed zones including a neutral zone by shifting the operation lever, and a torsion spring for applying a biasing force to bias the operation lever toward the neutral zone. It is set such that the biasing force exerted by the torsion spring is transmitted to a pivotal movement of the operation lever about the first shaft and the second shaft. Thereby, when the operation lever is shifted in any one of the available directions, the operation lever is applied with the biasing force to return the operation lever toward the neutral zone, thereby assuredly conveying an operator that the operation lever has been shifted to a desired speed zone.

19 Claims, 14 Drawing Sheets

MULTI DIRECTIONAL SHIFT MECHANISM

BACKGROUND OF THE INVENTION

This invention relates to a multi direction changeover or switchover mechanism used in a speed changer for an automotive vehicle or various switch mechanisms.

In a running game machine, a multi change gear system or a shift lever system is provided in a driver's compartment, and an operator (driver) operates an operation lever of the shift lever system to change a running speed of the game machine at a desired value. Thereby, the operator simulatively drives the running machine at the desired speed and enjoys driving.

The shift lever system has a shift plate formed with speed range setting grooves oriented in the lengthwise and widthwise directions over the plate. A neutral zone is defined in an intermediate portion of the speed range setting grooves through which an operation lever stands upright. The operator selects a desired speed range groove among the grooves and shifts the operation lever in a direction toward the selected speed range groove to fit the operation lever in the selected groove. When the operation lever is securely shifted and fitted in the selected groove, the speed of the running machine is changed to a desired speed in the selected speed range.

A multi directional shift mechanism is adopted in the above mentioned multi gear or shift lever system. The multi directional shift mechanism is not only adopted in the shift lever system but also applied to an electric switch circuitry or its equivalent in which a desired circuit is selected from among plural branch circuits.

In order to move the operation lever in the desired direction over the shift plate, the operation lever is required to be securely supported on the shift plate to be movable in the desired direction. To secure the support of the operation lever, there have been proposed several arrangements, as disclosed in Japanese Unexamined Patent Publication HEI No. 8-117442 and HEI No. 7-281590.

The former publication has the arrangement in which a spherical portion is formed at a position corresponding to the center of a pivotal rotation of an operation lever, and this spherical portion is supported by a stem member. The latter publication employs a dual-axis system in which an operation lever is pivotally supported in a box formed with a vertical through hole. Specifically, the operation lever is pivotally supported about a first axis which horizontally extends in the box, and is also pivotally supported about a second axis which horizontally extends in the box in a direction different from the extending direction of the first axis.

In the arrangement of the former publication, production of the spherical portion itself is difficult, and the operation lever including the spherical portion and the stem portion is also difficult. Also, a click mechanism for informing an operator that the operation lever has been securely set to a desired speed range becomes complex, resulting in raising the production cost of the multi directional shift mechanism.

In the arrangement of the latter publication in which the operation lever is pivotable about the two axes in the box, at least two bias force suppliers which respectively apply a biasing force to the operation lever are required to return the operation lever to the neutral zone. Accordingly, the bias force supply mechanism itself becomes complex, thereby raising the production cost of the multi directional shift mechanism.

SUMMARY OF THE INVENTION

In view of the above problems of the prior art, it is an object of the present invention to provide a multi directional shift mechanism with a dual axis system that enables returning an operation lever to a neutral zone with a bias force supply mechanism of a simplified construction.

A multi directional shift mechanism comprises: an operation lever which is movable in a first direction and a second direction, intersecting the first direction; a guide member for guiding the operation lever along a guiding passage formed on the guide member, the guiding passage including a neutral path extending along the second direction and branch paths, extending along the first direction, stemmed out from the neutral path at a plurality of certain positions; a pair of holding members, each formed with a plurality of recesses at a peripheral end thereof for receiving the operation lever in the recess to hold the operation lever at positions corresponding to the branch paths; and a biasing member for biasing the pair of holding members in such a manner that the peripheral ends of the respective holding members come close toward each other.

With this arrangement, when shifting the operation lever in the first direction from one recess to the other recess, an operator is required to exert a force against the biasing force of the biasing member to open up the holding members. In this way, while sliding the operation lever along the peripheral end in the first direction in pressing contact therewith, the operator is ascertained that the operation lever has been securely shifted to the other recess. Accordingly, the operator can notice the position of the operation lever easily.

A multi directional shift mechanism comprises: a support member having a first shaft and a second shaft perpendicularly intersecting the first shaft and pivotable around the first shaft; an operation lever pivotable around the second shaft; a guide member engageable with the operation lever for guiding the operation lever from a plurality of set positions along a neutral path extending along the second shaft to a first direction to position the operation lever at a certain position: a pair of holding members pivotally provided around the first shaft, each of the holding members having a peripheral end formed with a plurality of recesses at positions corresponding to the plurality of set positions, the peripheral ends of the holding members opposing toward each other; and a biasing member for biasing the holding members in such a manner that the peripheral ends of the holding members come close toward each other.

With this arrangement, the operation lever set in the neutral zone is held by the holding members due to the biasing force of the biasing member. Then, when an external force of an operator is exerted to the holding members to open up the holding members, one of the holding members is pivotally rotated in a direction opposite to the biased direction, while the other holding member keeps from rotating in the same direction as the one holding member due to the stopper. Thereby, the biasing force of the biasing member to return the one holding member to the biased direction is increased, and the operator must manipulate the operation lever with a force large enough to overcome the increasing biasing force, thereby giving a secured operation feeling to the operator.

When the operation lever is shifted in the first direction (extending direction of the first shaft) from the above state to the other recess, the operation lever slides along the peripheral end of the holding member in pressing contact therewith under the influence of the biasing force to pivotally return the holding member. Accordingly, the operator is applied with the biasing force during the sliding movement of the operation lever. Further, once the operation lever is fitted in the other recess from the pressing contact with the peripheral end, the operator manipulating the operation lever is temporarily released from the biasing force. Accordingly, the operator can notice that the operation lever has been securely shifted to the other recess.

The gist of this invention is as follows. When the operator tries to manipulate the operation lever in a second direction (extending direction of the second shaft), the operator is given the biasing force to return the holding members toward the first shaft via the operation lever. On the other hand, when the operator tries to manipulate the operation lever in the first direction, the operator must open up the holding members. Thus, the operator is also applied with the biasing force via the operation lever. Consequently, the biasing force of the biasing member is acted upon the operation lever which is pivoted about the first shaft or the second shaft. Accordingly, compared to the conventional arrangement in which two kinds of biasing members are necessary to apply the biasing force in the first direction and the second direction, the multi directional shift mechanism of this invention needs only one biasing member, thereby simplifying the structure of the bias force supply mechanism.

These and other objects, features and advantages of the present invention will become more apparent upon a reading of the following detailed description and accompanying drawings.

DETAILED DESCRIPTION OF THE INVENTION

Figure 1:
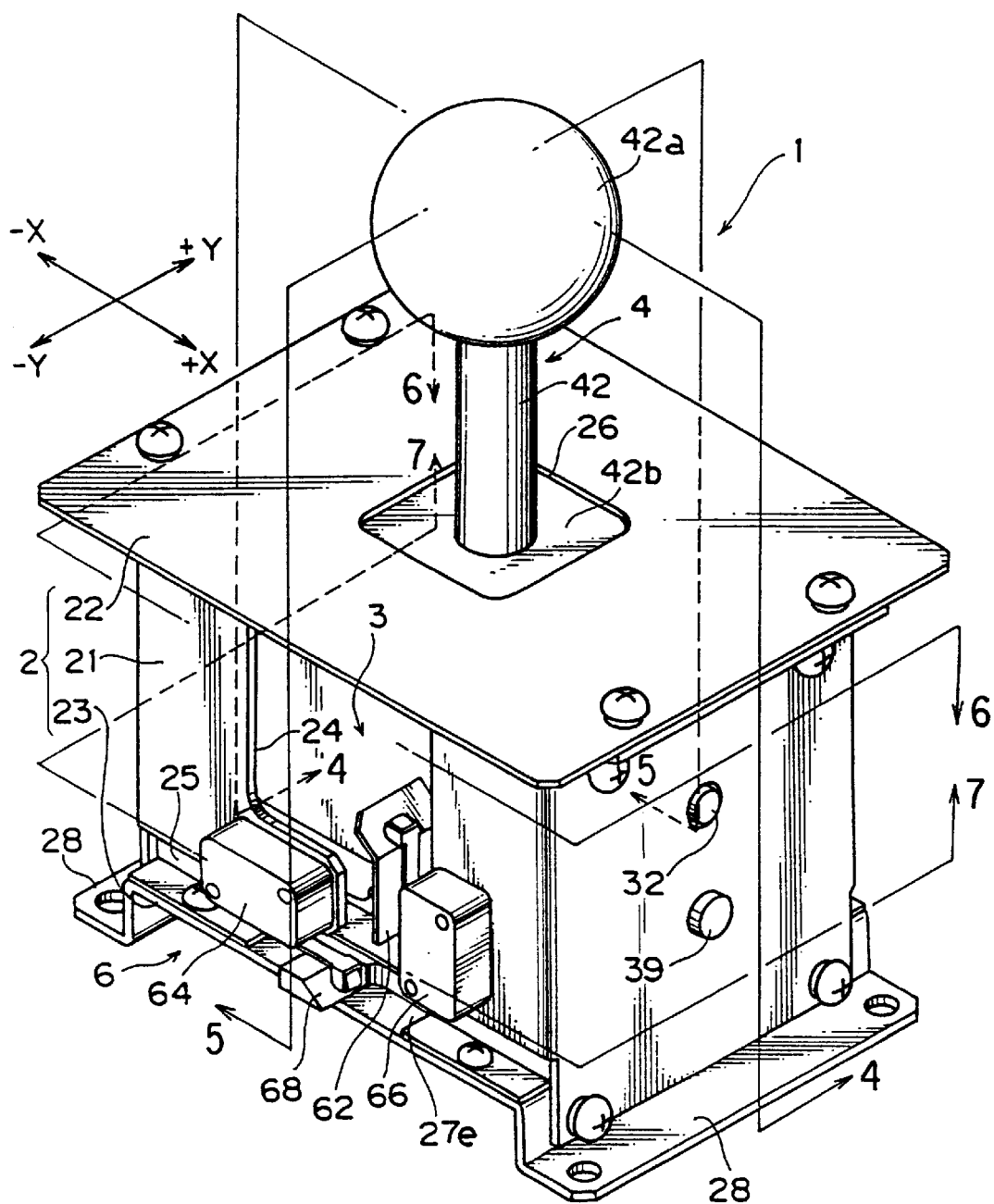
FIG. 1 is a perspective view of an external appearance of a multi directional shift mechanism according to this invention when viewed from obliquely upward.
Figure 2:
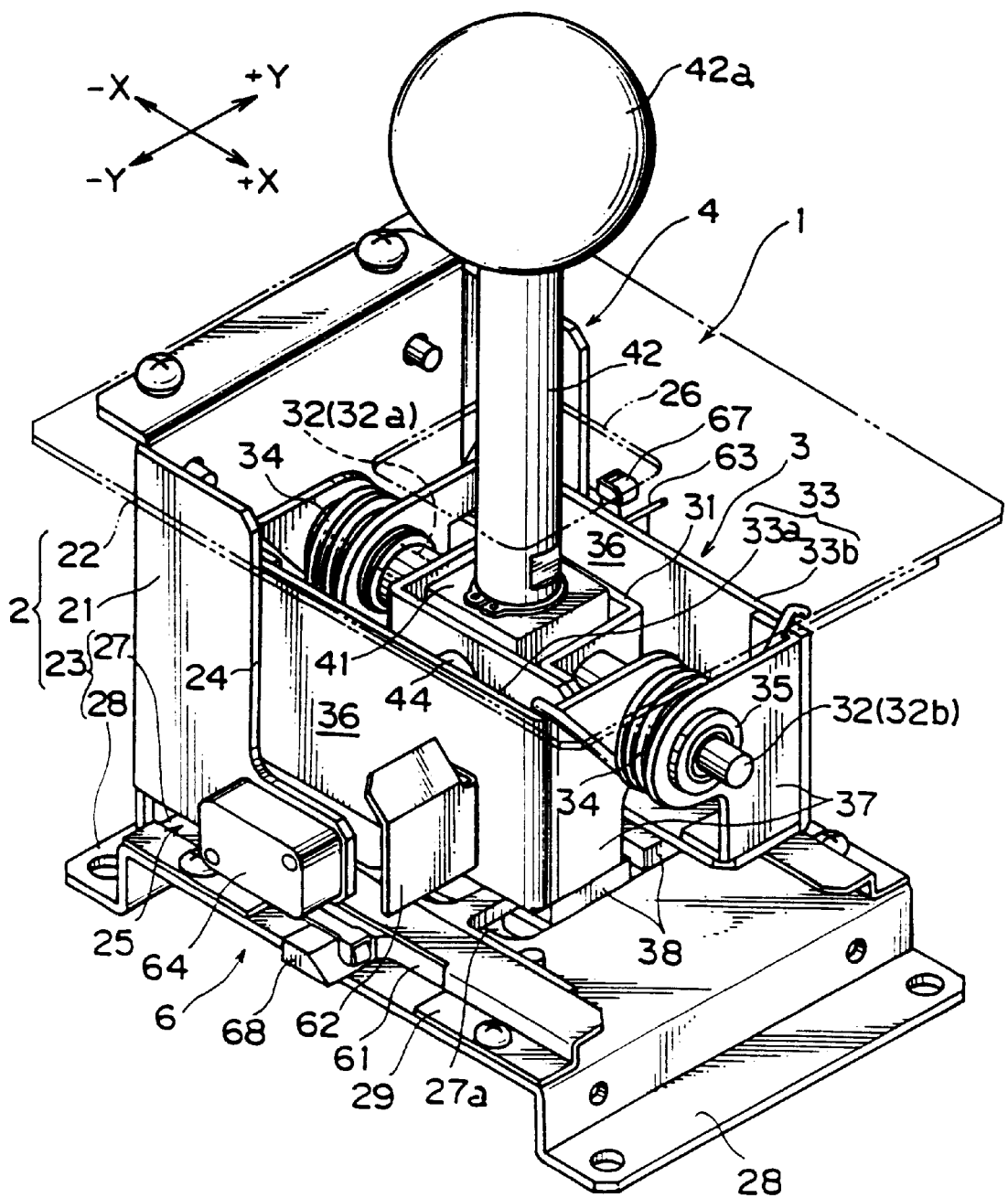
FIG. 2 is a perspective view showing an internal arrangement of the multi directional shift mechanism when viewed from obliquely upward.
Figure 3:
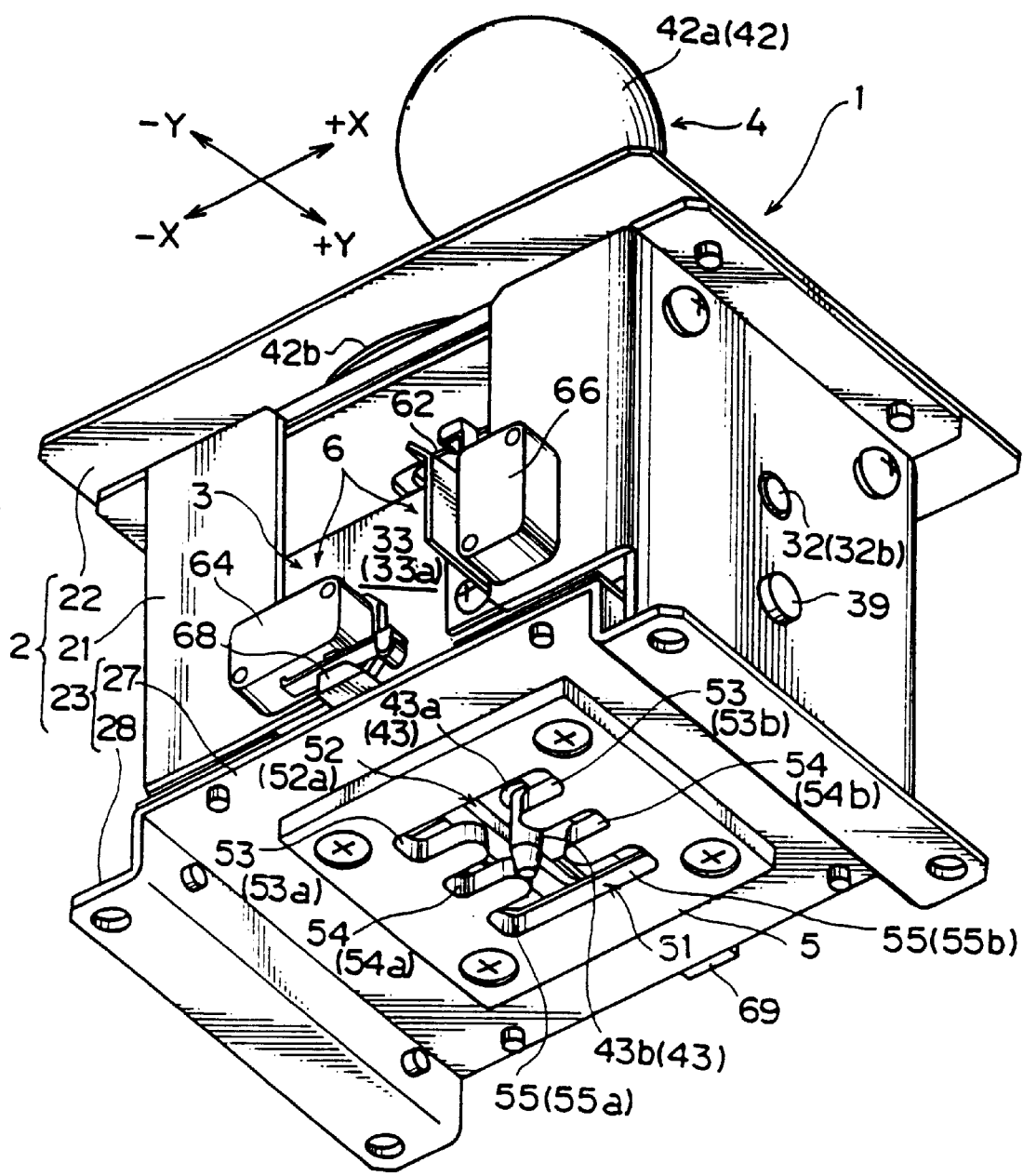
FIG. 3 is a perspective view of an external appearance of the multi directional shift mechanism when viewed from obliquely downward.
Figure 4:
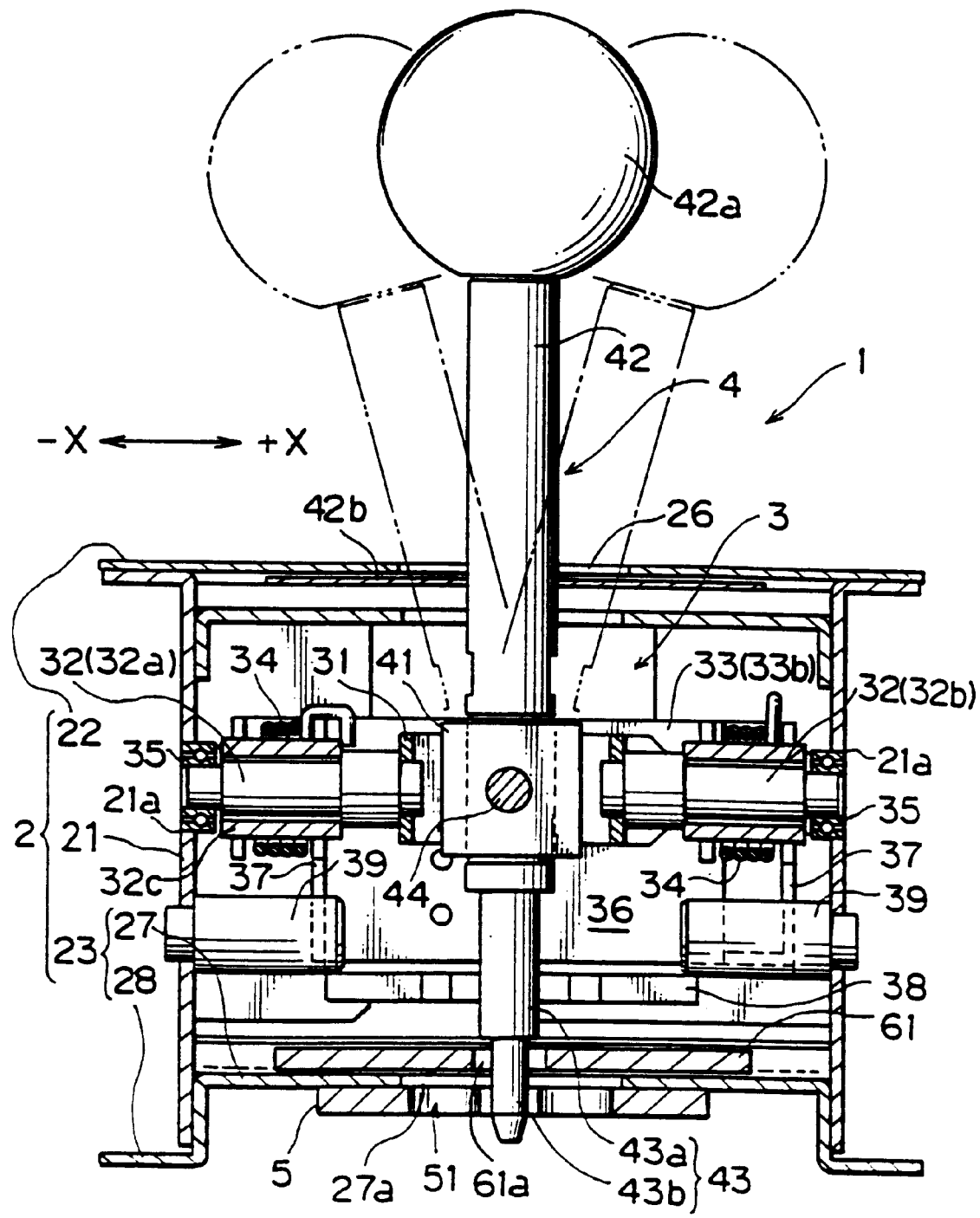
FIG. 4 is a cross sectional view of the multi directional shift mechanism taken along the line A—A in FIG. 1.
Figure 5:
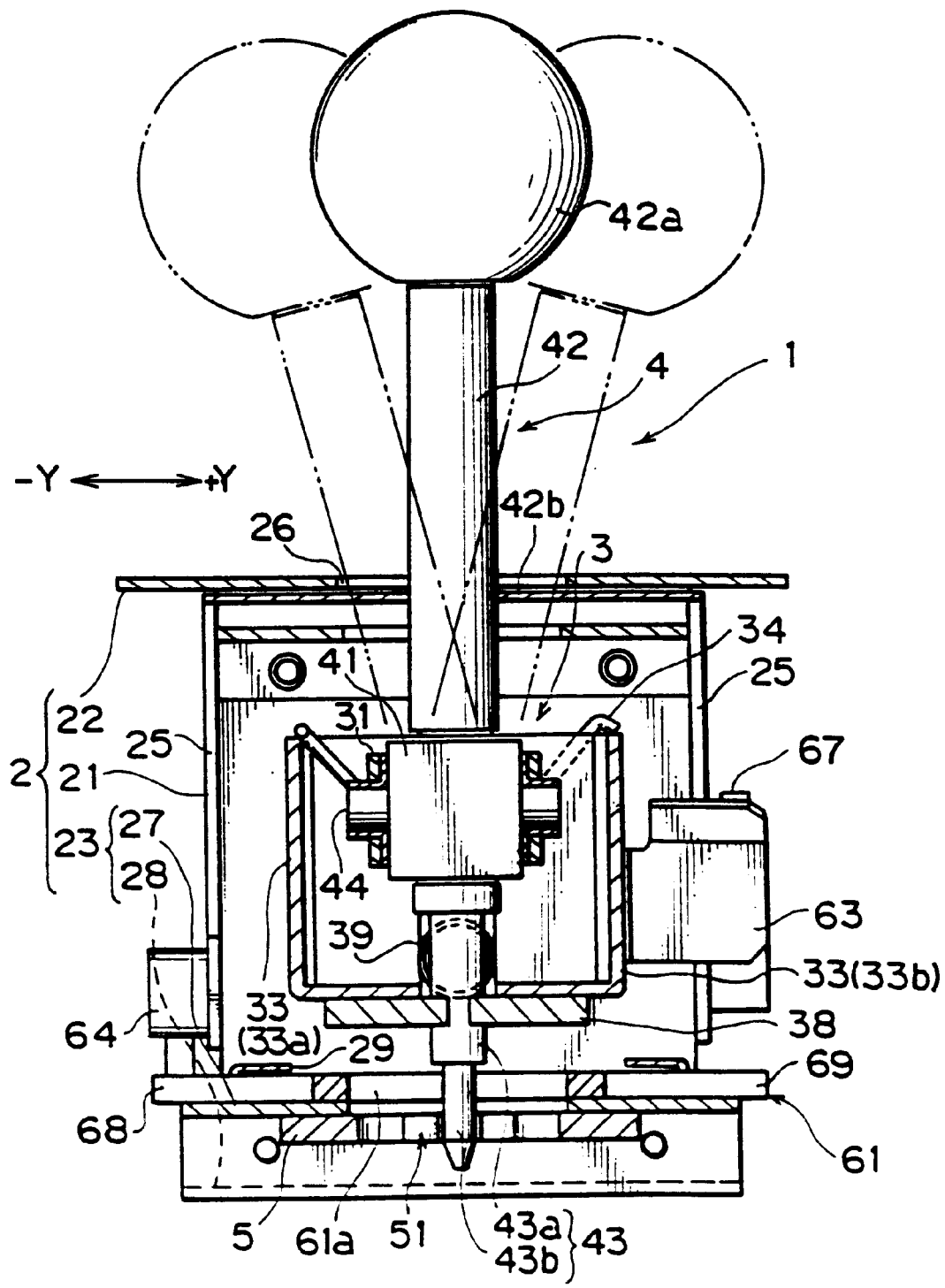
FIG. 5 is a cross sectional view of the multi directional shift mechanism taken along the line B—B in FIG. 1.
Figure 6:
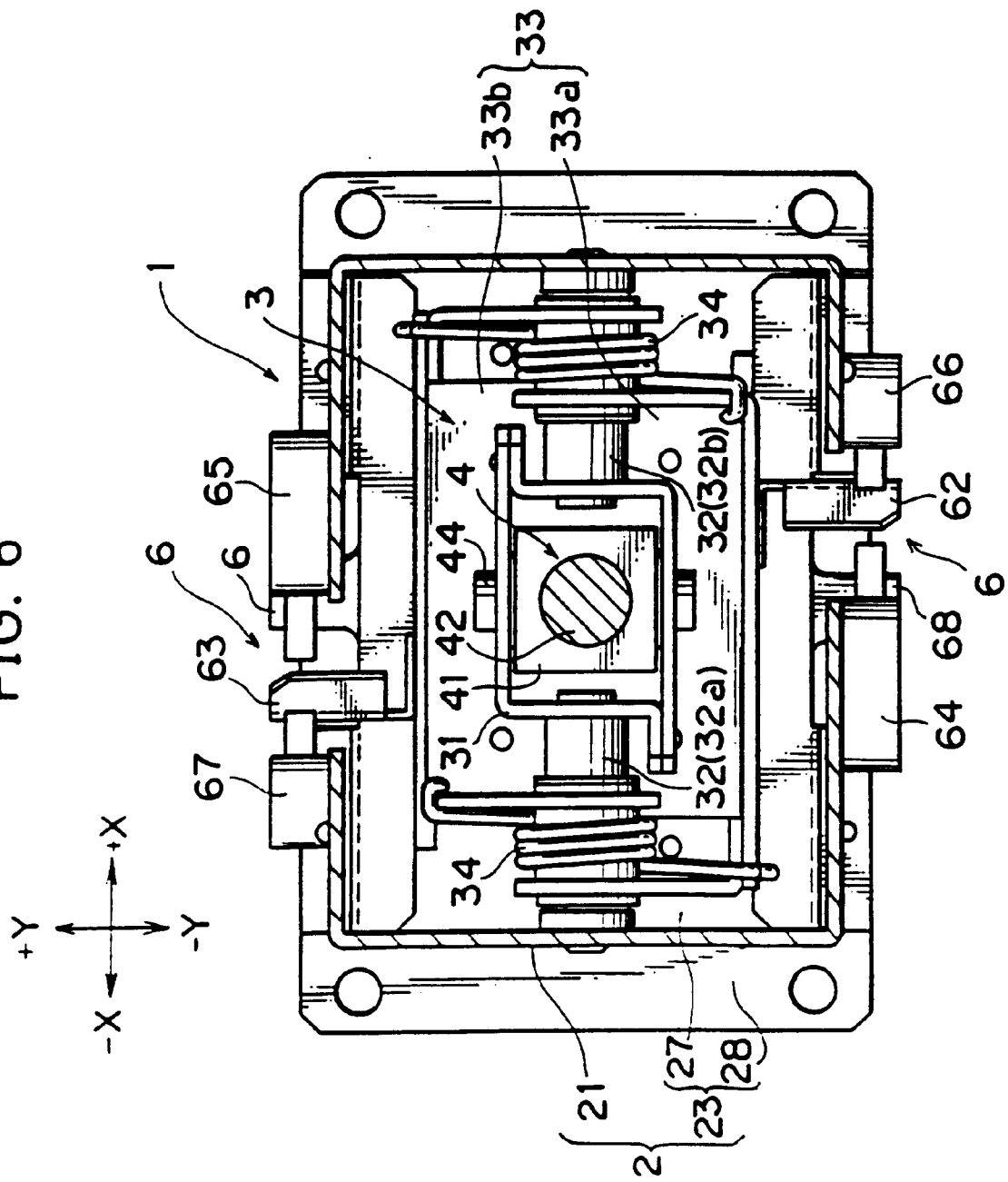
FIG. 6 is a cross sectional view of the multi directional shift mechanism taken along the line C—C in FIG. 1.
Figure 7:
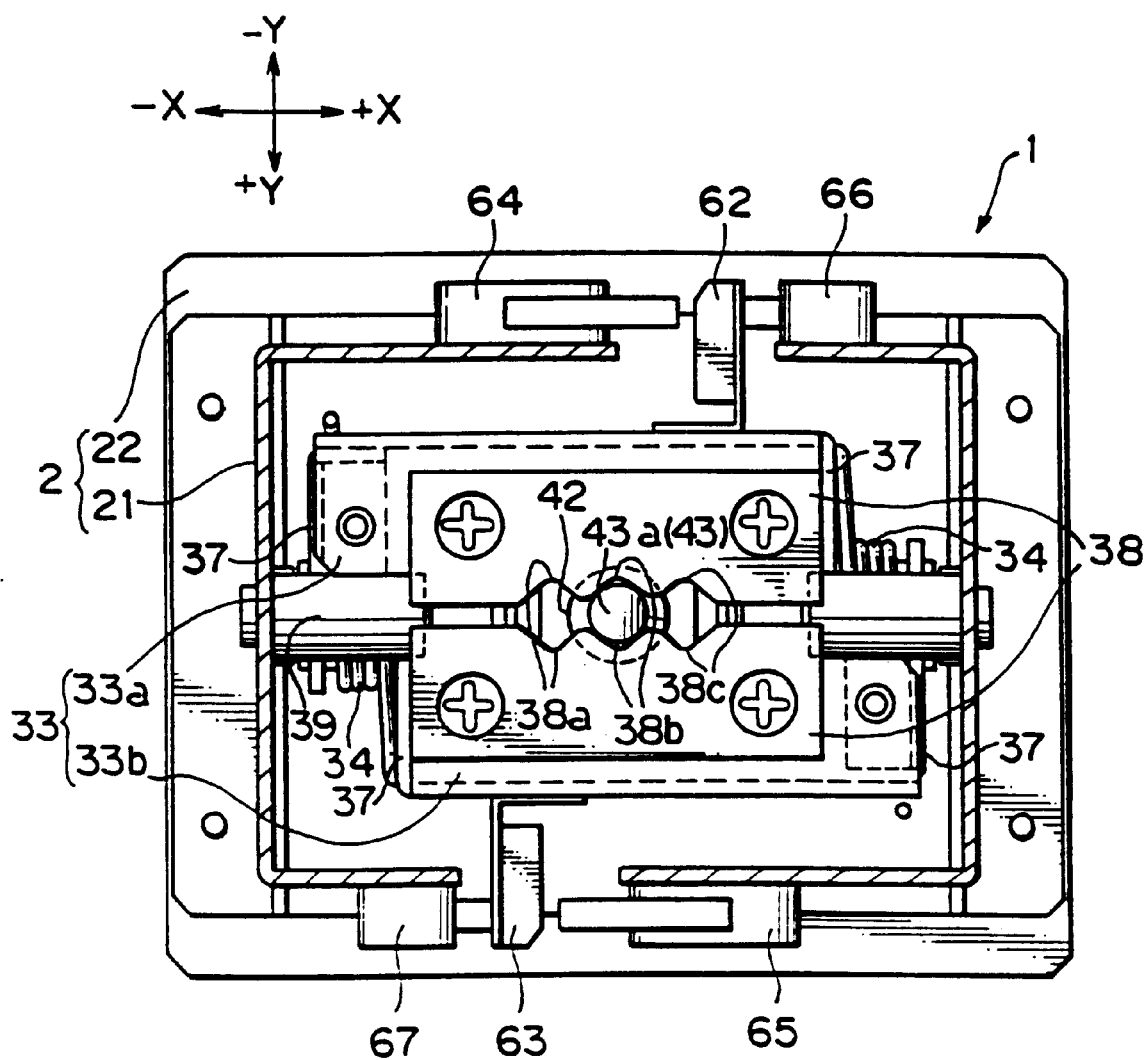
FIG. 7 is a cross sectional view of the multi directional shift mechanism taken along the line D—D in FIG. 1.
Figure 14:
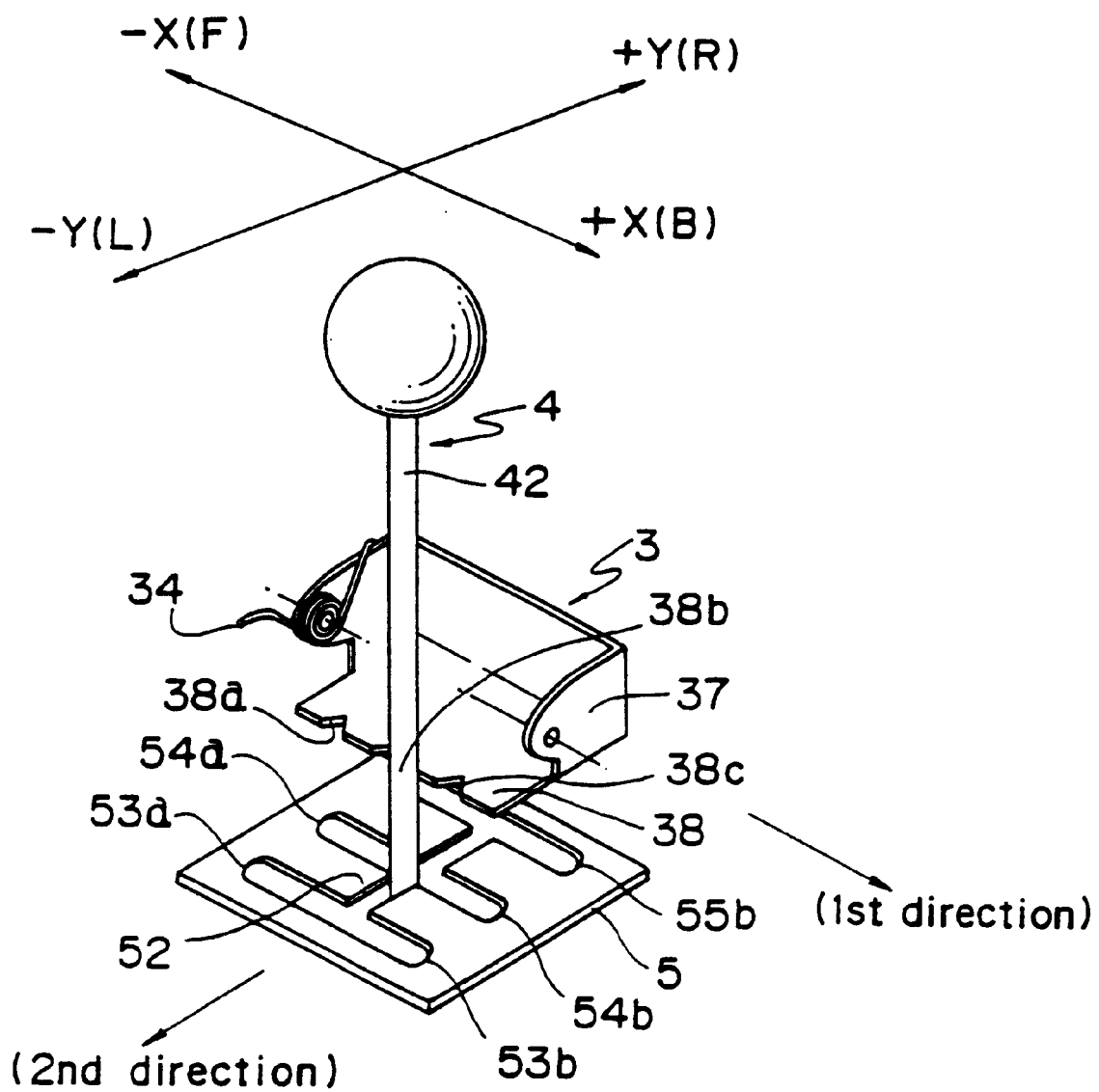
FIG. 14 is a schematic diagram showing directional & positional relationships between essential parts of this invention.

A preferred embodiment of this invention is described with reference to the accompanying drawings. It should be noted that, the readers of this description, hereinafter, are encouraged to refer FIG. 14 showing positional and directional relationships among the essential parts of this invention whenever a difficulty arises in conceiving the directionality of movements or those of essential parts. FIGS. 1 to 3 are perspective views showing an embodiment of a multi directional shift mechanism of this invention. FIG. 1 shows an external appearance of the shift mechanism when viewed from obliquely upward; FIG. 2 shows an internal arrangement of the changeover mechanism when viewed from obliquely upward; and FIG. 3 shows an external appearance when viewed from obliquely downward. FIG. 4 is a cross-sectional view of the shift mechanism taken along the line A—A of FIG. 1; FIG. 5 is a cross-sectional view of the shift mechanism taken along the line B—B of FIG. 1; FIG. 6 is a cross-sectional view of the shift mechanism taken along the line C—C of FIG. 1; and FIG. 7 is a cross-sectional view of the shift mechanism taken along the line D—D of FIG. 1.

In this embodiment, a shift lever mechanism used in a simulative running game machine is described as an example of the multi directional shift mechanism. It should be noted that, throughout the drawings, X-X direction is fore and aft direction of the shift lever mechanism, and Y-Y direction is widthwise direction of the mechanism. Specifically, (-X) direction is a forward direction. (+X) direction is a rearward direction, (-Y) direction is a leftward direction, and (+Y) direction is a rightward direction.

As shown in FIGS. 1 to 7, the shift lever mechanism 1 comprises a box-like casing 2, a bias force supply mechanism 3 provided in the casing 2, an operation unit 4 which is given a biasing force by the bias force supply mechanism 3, a positioning member (or guide member) 5 (see FIG. 3) for positioning the operation unit 4 at plural setting positions (operable positions), and a detecting mechanism (detector) 6 for detecting the position of the operation unit 5 relative to the positioning member 5.

The casing 2 includes a side body 21, a top plate 22, and a bottom plate 23. The side body 21, the top plate 22, and the bottom plate 23 define a hollow portion inside the casing 2. The top plate 22 covers an upper opening of the hollow portion, and the bottom plate 23 covers a lower opening of the hollow portion. Referring to FIG. 1, side walls of the side body 21 are formed with a vertical cutaway 23 (only one cutaway is shown in FIG. 1) which is continued to the top plate 22. A transverse slit 25 which extends in the X-X direction is formed at a lower end of the left (right) side wall of the casing 2 (only left side transverse slit 25 is shown in FIG. 1). Communication between mechanical parts inside and outside of the casing 2 is performed through the openings 24 and 25. In other words, the position of the operation unit 4 inside the casing 2 is detected through the openings 24 and 25.

The top plate 22 is fixedly connected to the side body 21 by connecting the top plate 22 with an extension (see FIG. 3) of the side body 21 which extends outward in the (−X) and (+X) direction from an upper end of the side body 21 by fastening means such as screws. A square shaped through hole 26 in plan view is formed in the middle of the top plate 22 to render the operation unit 4 operable in four directions.

The bottom plate 23 has widthwise dimensions slightly larger than those of the side body 21 to form a side extension 27e (see FIG. 1) at opposite ends in the Y-Y direction. A stepped portion (or connecting portion) 28 is formed at opposite ends of the bottom plate 23 in the (−X) and (+X) directions. Thereby, a base block 27 is formed in the middle of the bottom plate 23. The stepped portion 28 is adapted for connecting the shift lever mechanism with an unillustrated part. The side body 21 is fixedly connected to the bottom plate 23 by connecting a lower end of the side body 21 at opposite sides thereof in the X-X direction to the base block 27 with fastening means such as screws. In the connected state, the side extensions 27e, 27e (only one side extension is shown in FIG. 1) are projected outward from the side body 21.

A pair of substantially L-shaped connecting pieces (brackets) 29 are provided on the side extension 27e (27e) at opposite ends in the X-X direction and fixedly connected to the side extension 27e (base block 27) by fastening means such as screws. A slider (movable member) 61 which is described later is disposed over the base block 27 of the bottom plate 23. The movable member 61 is movable along four directions, i.e., (−X) and (+X) directions and (−Y) and (+Y) directions in accordance with an operation of the operation unit 4. The base block 27 is formed with a rectangular center opening 27a (see FIG. 4) in the middle thereof. Part of the operation unit 4 (a positioning rod 43 to be described later) is freely movable in the center opening 27a.

The bias force supply mechanism 3 includes, as shown in FIGS. 2 and 4, a support box 31 for supporting the operation unit 4, a first shaft 32 which transversely extends inside the casing 2 along the X-X direction and passes through the support box 31, a pair of holding members 33 (left and right holding members 33a, 33b) which is pivoted about an axis of the first shaft 32, and a torsion spring (biasing member) 34 for applying a biasing force to the holding members 33a, 33b.

As shown in FIG. 2, the support box 31 has a square shape in plan view. The support box 31 is formed by bending each of two flat plates into an L-shape and jointing the L-shaped plates in such a shape as to define a square hollow therebetween. The first shaft 32 consists of a front shaft 32a and a rear shaft 32b. The support box 31 is fixedly supported by the front shaft 32a and the rear shaft 32b inside the casing 2.

Referring to FIG. 4, a front end of the front shaft 32a and a tail end of the rear shaft 32b are respectively mounted in support holes 21a, 21a which are formed in side walls of the side body 21 opposing to each other in the X-X direction via bearings 35, 35. Thereby, the first shaft 32 is rotatable in the side body 21 about the axis thereof. As shown in FIG. 4, a bush 32c is mounted on the first shaft 32 between the bearing 35 and the support box 31.

As shown in FIG. 2, the holding member 33 has the left holding member 33a and the right holding member 33b. The left holding member 33a (right holding member 33b) has a substantially U-shape in plan view, and includes a flat vertical portion 36, a pair of front and rear brackets 37, 37 respectively extending from front and rear ends of the flat vertical portion 36 in the Y-Y direction at a substantially right angle toward the first shaft 32, and a substantially horizontal bottom portion 38 extending along a lower end of the flat vertical portion 36 between the front and rear brackets 37, 37. The flat vertical portions 36 of the holding members 33a, 33b oppose to each other with the first shaft 32 interposed therebetween.

As shown in FIG. 7, each of the horizontal bottom portions 38, 38 are formed with several recesses in an intermediate portion along a peripheral end thereof opposing to each other. In this embodiment, the peripheral end of the bottom portion 38 is formed with three recesses, i.e., forward recess 38a, a center recess 38b, and a rear recess 38c. These recesses 38a, 38b, 38c define a jointed recess 38A, 38B, 38C respectively when the holding members 33a, 33b are biased toward each other due to a biasing force of the torsion spring 34. The jointed recesses 38A, 38B, and 38C are adapted to hold the positioning rod 43 of the operation unit 4 at a certain position, as will be described later.

The biasing member (torsion spring) 34 consists of a forward portion and a rear portion. The forward spring 34 (rear spring 34) is wound around the bush 32c (32c). As shown in FIG. 6, one end of the forward spring 34 (rear spring portion 34) is connected to the flat vertical portion 36 of the left holding member 33a, and the opposite end thereof is connected to the flat vertical portion 36 of the right holding member 33b. With this arrangement, the holding members 33a, 33b are biased toward each other.

A pair of front and rear bar-like stoppers 39, 39 (see FIG. 4) are provided below the first shaft 32 such that the front stopper (rear stopper) 39 extends inward from a front wall (rear wall) of the side body 21. Lower ends of the left and right holding members 33a, 33b are abutted against the front and rear stoppers 39, 39 in a state that the holding members 33a, 33b are biased toward each other. Thereby, the peripheral ends of the bottom portions 38, 38 are prevented from coming into contact with each other.

The operation unit 4 includes a rectangular parallelepiped lever support member 41 which is mounted in the support box 31, an operation lever 42 extending upward from a top surface of the lever support member 41, and the positioning rod 43 (see FIGS. 4 and 5) which extends downward from a bottom surface of the lever support member 41. An operation knob 42a (also referred to as a grip end) of a spherical shape is mounted at an upper end of the operation lever 42 to facilitate manipulation of the operation lever 42.

A flange plate 42b with an area larger than the area of the rectangular hole 26 is attached on a backside surface of the top plate 22 in such a state as to allow the operation lever 42 to be freely movable inside the support box 31. The flange plate 42b prevents the internal arrangement of the casing 2 to be seen from outside.

As shown in FIGS. 2 and 5, the lever support member 41 is pivotally supported about an axis of a second shaft 44 which passes through the support box 31 transversely along the Y-Y direction. The operation lever 42 is pivotally supported about the axis of the second shaft 44 fore and aft (along X-X direction), and is also pivotally supported about the axis of the first shaft 32 leftward and rightward (along Y-Y direction). With this arrangement the operation lever 42 is tilted in any of these four directions.

The positioning rod 43 includes an upper rod portion 43a which extends downward immediately below the lever support member 41, and a lower rod portion 43b which coaxially extends downward from a lower end of the upper rod portion 43a. The upper rod portion 43a projects downward from a bottom surface of the bottom portion 38 of the holding member 33a (33b) by a small length, and the lower rod portion 43b has a lead end thereof protruded downward through the center opening 27a of the bottom plate 23.

As shown in FIG. 7, the diameter of the upper rod portion 43a is set such that a small clearance is defined between the opposing bottom portions 38, 38 when the positioning rod 43 is fitted in any of the jointed recesses 38A, 38B, 38C of the holding members 33a, 33b. With this arrangement, the upper rod portion 43a is securely held between the bottom portions 38, 38 of the holding members 33a, 33b by a biasing force of the torsion spring 34. Further, manipulating the operation lever 42 to move the upper rod portion 43a either in the (−X)- or (+X)-direction enables the upper rod portion 43a to shift from one recess to another recess.

As shown in FIG. 3, the positioning member 5 (rectangular flat plate) is formed with a guide groove 51 in the middle thereof. The guide groove 51 (or a guiding passage) consists of a neutral groove (neutral path) 52 which is formed in the middle thereof along Y-Y direction, a left groove 53 which is formed on a left end of the guide groove 51 along X-X direction, a right groove 55 which is formed on a right end of the guide groove 51 along X-X direction, and a center groove 54 which is formed between the left groove 53 and the right groove 55 along X-X direction. The neutral groove 52 defines a neutral zone 52a for the operation lever 42; and the left groove 53, the right groove 55, and the center groove 54 define speed zones which are described later. The width of the guide path is set such that the lower rod portion 43b is slidable in contact therewith.

The operation lever 42 is pivotable about the axis of the first shaft 32 by moving the operation knob 42a along sideways directions, i.e., Y-Y direction. Thereby, the lower rod portion 43b slides back and forth along the neutral groove 52. When the operation knob 42a is moved fore and aft directions, i.e., X-X directions in a state that the lower rod portion 43b is located at the leftmost end of the neutral groove 52, the lower rod portion 43b slides along the left groove 53. Likewise, when the operation knob 42a is moved in the X-X direction in a state that the lower rod portion 43b is located at the center of the neutral groove 52, the lower rod portion 43b slides along the center groove 54. Similarly, when the operation knob 42a is moved in the X-X direction in a state that the lower rod portion 43b is located at the rightmost end of the neutral groove 52, the lower rod portion 43b slides along the right groove 55.

In this embodiment, the neutral zone 52a corresponds to the neutral groove 52. A forward portion (−X direction) and a rear portion (+X direction) of the left groove 53 respectively correspond to a first speed zone 53a and a second speed zone 53b. Similarly, a forward portion and a rear portion of the center groove 54 respectively correspond to a third speed zone 54a and a fourth speed zone 54b, and a forward portion and a rear portion of the right groove 55 respectively correspond to a fifth speed zone 55a and a sixth speed zone 55b.

Specifically, when the lower rod portion 43b of the positioning rod 43 (i.e., an opposite end of the operation lever 42) is located in the neutral zone 52a, a driving force to drive an engine of a running machine is not transmitted to a gear wheel of the running machine. Namely, in this state, the running machine is simulatively set to a so-called neutral state. From this state, when the lower rod portion 43b is shifted to any of the first to the sixth speed zones 53a to 55b, the driving force to simulatively drive the engine is transmitted to the gear wheel with a predetermined reduction ratio.

In this embodiment, when the operator releases holding of the operation knob 42a after the lower rod portion 43b is set to any of the first to the sixth speed zones 53a to 55b, the fitted state of the lower rod portion 43b in the groove corresponding to the set speed zone is retained against the biasing force of the torsion spring 34. On the other hand, when the operation lever 42 is shifted back to the neutral zone 52a (neutral groove 52) extending in the Y-Y direction, the operation lever 42 is returned to the center of the neutral groove 52 by the biasing force of the torsion spring 34, and is set in an upright posture.

In other words, a driver or an operator releases holding of the operation knob 42a after the lower rod portion 43b is fitted in the desired speed zone to simulatively drive the running machine (e.g., an automotive vehicle) at a certain speed, and then holds the operation knob 42a again and shifts the lower rod portion 43b to another speed zone to change the running speed, i.e., to change the gear reduction ratio.

As shown in FIG. 2, the detecting mechanism 6 includes the slider (movable member) 61, a right detecting piece 62, a left detecting piece 63, a forward detecting switch 64, a rearward detecting switch 65, a right detecting switch 66, and a left detecting switch 67. The slider 61 is disposed over the base block 27 of the bottom plate 23 of the casing 2. The right detecting piece 62 is projected outward from the flat vertical portion 36 of the left holding member 33a. The left detecting piece 63 is projected outward of the flat vertical portion 36 of the right holding member 33b. The forward detecting switch 64 and the rearward detecting switch 65 are provided to detect a forward and rearward movement of the slider 61, which is described later. The right detecting switch 66 is provided outside of an outer surface of the left wall of the side body 21 of the casing 2 at a position opposing to the right detecting piece 62. The left detecting switch 67 is provided outside of an outer surface of the right wall of the side body 21 of the casing 2 at a position opposing to the left detecting piece 63.

The switches 64 to 67 in this embodiment are e.g., a limit switch or a micro switch which is turned to an ON-state when a contact piece comes into contact with a detecting arm of the switch and the detecting arm is actuated.

The right detecting piece 62 and the right detecting switch 66 are detectors for detecting a (+Y)-directed pivot of the operation lever 42 about the axis of the first shaft 32, i.e., rightward inclination of the operation lever 42 with respect to the first shaft 32. The left detecting piece 63 and the left detecting switch 67 are detectors for detecting a (−Y)-directed pivot of the operation lever 42 about the axis of the first shaft 32, i.e., leftward inclination of the operation lever 42 with respect to the first shaft 32. The detecting pieces 62, 63 are projected outward in the Y-Y direction through the vertical side cutaways 24, 24 formed in the side body 21 of the casing 2. The detecting switches 66, 67 are mounted at the outer surface of the casing 2 at a position opposing to the detecting pieces 62, 63, respectively.

The slider 61, the forward detecting switch 64, and the rearward detecting switch 65 are adapted for detecting a forward inclination and a rearward inclination of the operation lever 42 with respect to the second shaft 44. As shown in FIGS. 4 and 5, the slider 61 is disposed between the bottom portion 38 of the holding members 33 and the base block 27. The slider 61 is formed with a rectangular hole 61a (see FIG. 4) in the middle thereof and has a certain dimension in the X-X and Y-Y directions. The lower rod portion 43b of the positioning rod 43 is inserted in the rectangular hole 61a. The slider 61 is movable fore and aft in association with a forward and backward movement of the lower rod portion 43b with respect to the second shaft 44. The rectangular hole 61a has such an inner widthwise dimension as not to interfere a pivot of the lower rod portion 43b in the Y-Y direction (see FIG. 5).

The rectangular hole 61a of the slider 61 enables the following operation. Specifically, the slider 61 slides forward by a forward movement of the positioning rod 43. When the positioning rod 43 is shifted backward from the forward position, the slider 61 starts moving backward accompanied by the backward moving lower rod portion 43b after the lower rod portion 43b abuts against a rear end of the rectangular hole 61a.

Similarly, the slider 61 which has slid backward by a backward movement of the positioning rod 43 starts moving forward accompanied by the forward moving lower rod portion 43b after the lower rod portion 43b abuts against a forward end of the rectangular hole 61a.

In other words, the slider 61 slides forward and backward in accordance with a forward and backward movement of the positioning rod 43 with a certain time lag. This time lag is set such that the operation of the operation lever 42 simulates an operation of a shift lever of an automotive vehicle. Accordingly, an operator manipulating the operation lever 42 of the shift lever mechanism can simulatively enjoy driving.

Referring to FIG. 6, the slider 61 has a forward detecting piece 68 which is projected leftward in the (−Y) direction, and a rearward detecting piece 69 which is projected rightward in the (+Y) direction. The detecting pieces 68, 69 project outward from the transverse slits 25, 25 formed in the base block 27. The forward detecting piece 68 of the slider 61 opposes to the forward detecting switch 64 which is provided on the outer surface of the casing 2, and the rearward detecting piece 69 opposes to the rearward detecting switch 65.

In the detecting mechanism 6 having the above arrangement, when the operation knob 42a is operated to incline the operation lever 42 forward, the forward detecting piece 68 moves backward. Then, the forward detecting switch 64 detects the presence of the forward detecting piece 68 and turns on. On the other hand, when the operation knob 42a is operated to incline the operation lever 42 rearward, the rearward detecting piece 69 moves forward. Then, the rearward detecting switch 65 detects the presence of the rearward detecting piece 69 and turns on.

Further, when the operation knob 42a is operated to incline the operation lever 42 leftward, the left detecting piece 63 is lifted upward. Then, the left detecting switch 67 detects the presence of the left detecting piece 63 and turns on. On the other hand, when the operation knob 42a is operated to incline the operation lever 42 rightward, the right detecting piece 62 is lifted upward. Then, the right detecting switch 66 detects the presence of the right detecting piece 62 and turns on.

In this way, the detecting mechanism 6 detects the four directional movement of the operation lever 42, i.e., fore and aft and left and right movements. Accordingly, combining detection results of the switches 64, 65, 66, and 67 enables judgement as to whether the operation lever 42 is set in the neutral zone 52a. Further, if it is detected that the operation lever 42 is not set in the neutral zone 52a, the detecting mechanism 6 detects the speed zone in which the operation lever 42 is currently set.

Figure 8:
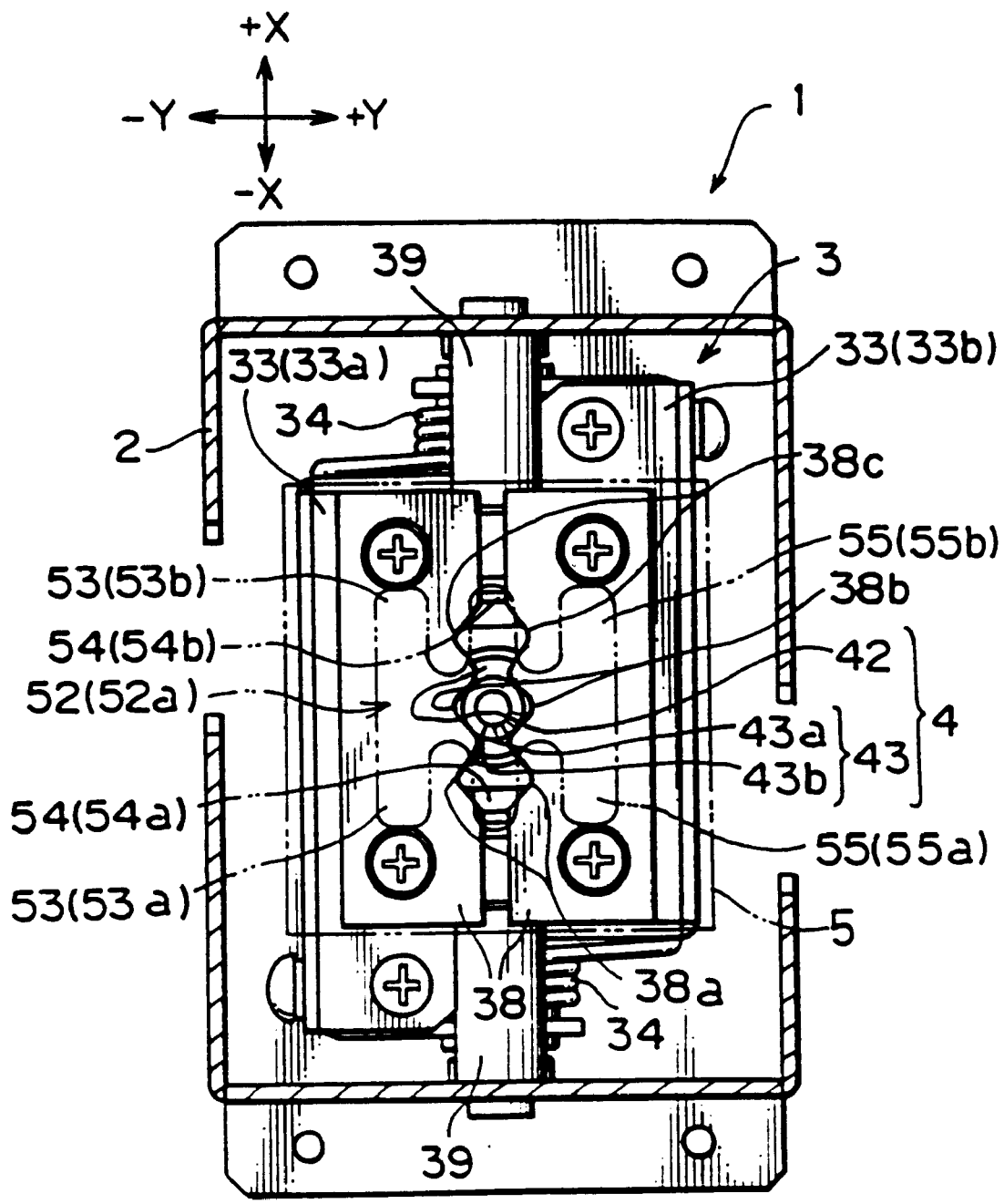
FIG. 8 is a plan view of the multi directional shift mechanism, specifically showing a state that an operation lever is set in the middle of a neutral zone.
Figure 9:
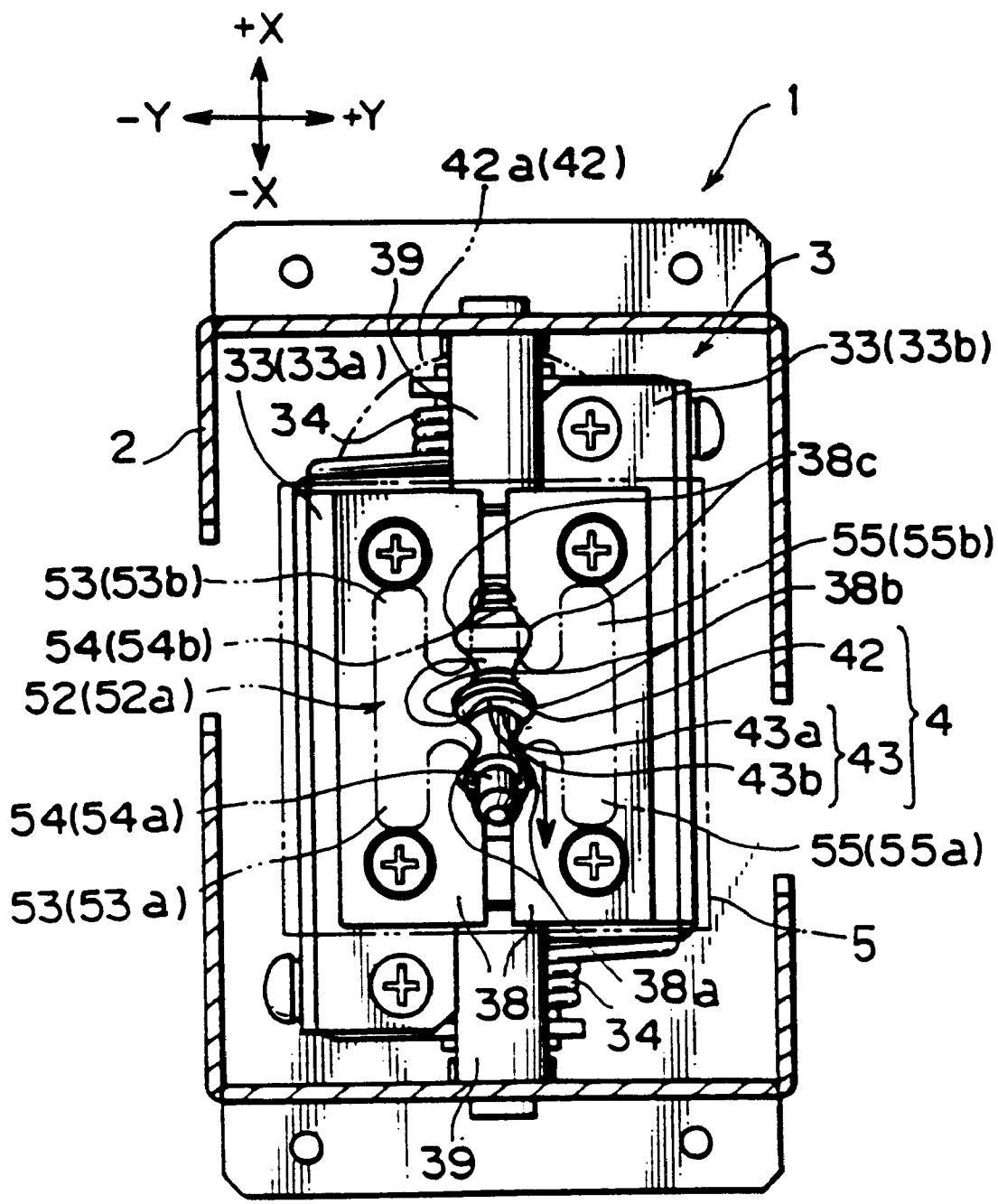
FIG. 9 is a plan view of the multi directional shift mechanism, specifically showing a state that the operation lever is set in a third speed zone.
Figure 10:
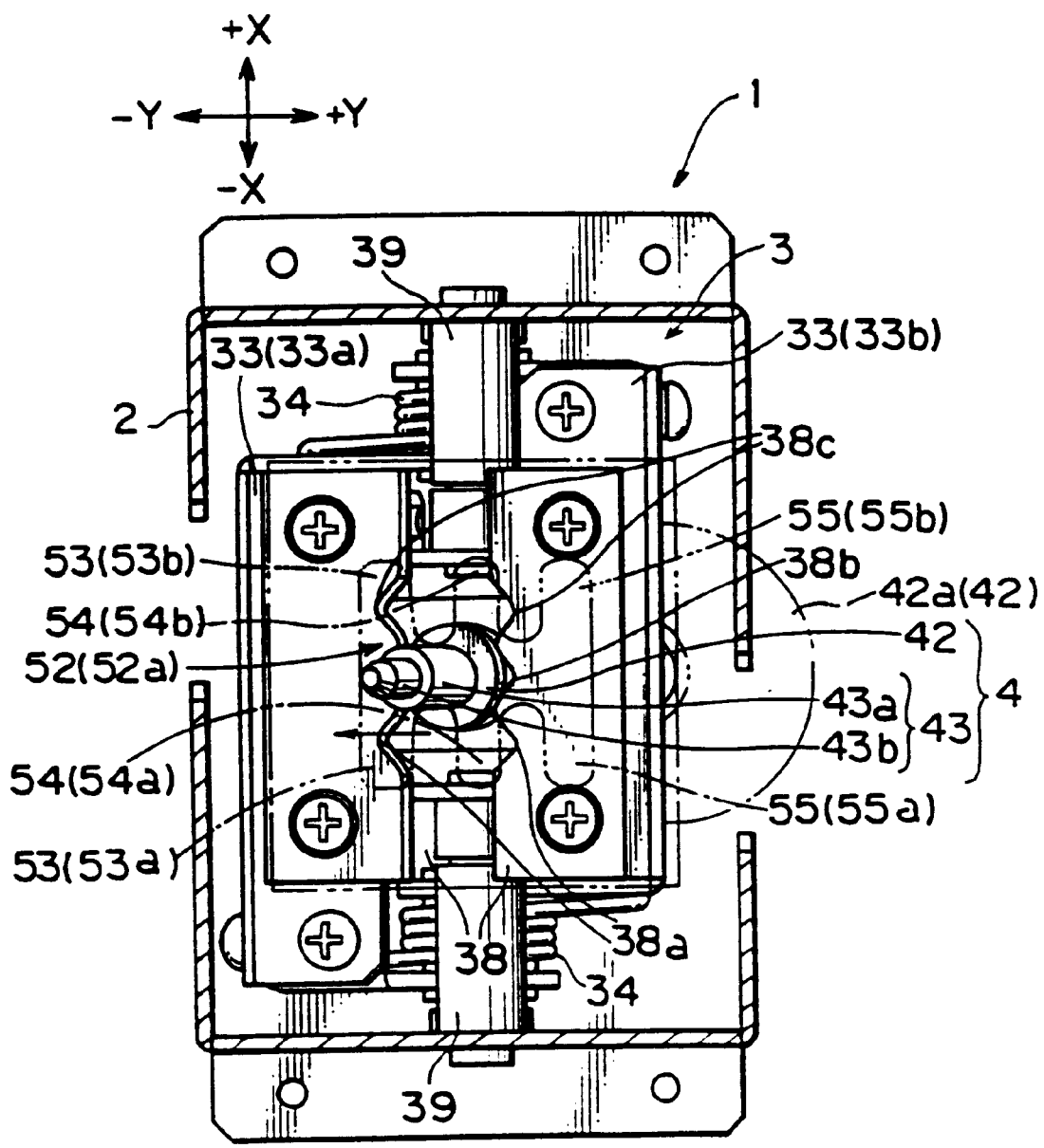
FIG. 10 is a plan view of the multi directional shift mechanism, specifically showing a state that the operation lever is set in the neutral zone with a positioning rod tilted leftward.
Figure 11:
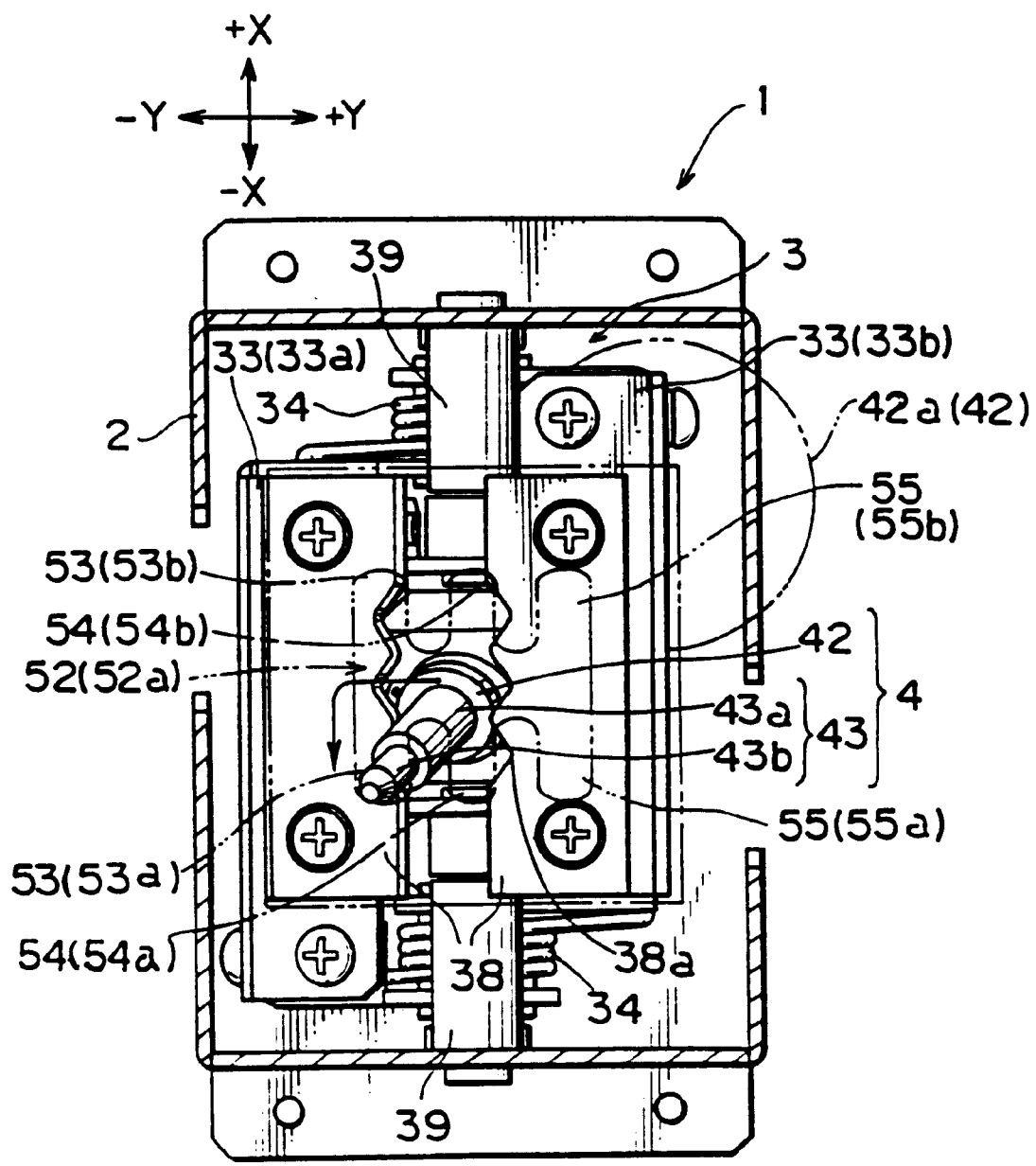
FIG. 11 is a plan view of the multi directional shift mechanism, specifically showing a state that the operation lever is set in a first speed zone.

Referring to FIGS. 8 to 11, an operation of the shift lever mechanism of this invention is described. FIG. 8 shows a state that the operation lever 42 (positioning rod 43) is positioned in the center of the neutral zone 52a; FIG. 9 shows a state that the positioning rod 43 is set in the third speed zone 54a; FIG. 10 shows a state that the operation lever 42 is inclined rightward (i.e., the positioning rod 43 is inclined leftward); and FIG. 11 shows a state that the positioning rod 43 is set in the first speed zone 53a.

As shown in FIG. 8, when the operation lever 42 is set in the neutral zone 52a, the upper rod portion 43a of the positioning rod 43 is fitted in the center recess 38b (jointed center recess 38B) of the bottom portions 38, 38 of the left and right holding member 33a, 33b. In this state, the left holding member 33a and the right holding member 33b are biased toward each other by a biasing force of the torsion spring 34. Accordingly, the upper rod portion 43a is securely held by the holding members 33a, 33b in the jointed center recess 38B, and the operation lever 42 securely stands in an upright posture (see FIGS. 1 and 2).

Then, when the operation lever 42 is inclined rearward (the right-side state shown by the phantom line in FIG. 4), the positioning rod 43 is inclined forward. Thereby, the upper rod portion 43a is slipped out of the jointed center recess 38B, and is shifted to the forward recesses 38a, 38a. When the upper rod portion 43a slides from the center recess 38b to the forward recess 38a, the upper rod portion 43a exerts a force to open up the left holding member 33a and the right holding member 33b against the biasing force of the torsion spring 34. Thereby, the left and right holding members 33a, 33b are pivoted about the axis of the first shaft 32 in such a direction as to be away from each other against the biasing force of the torsion spring 34.

Subsequently, when the upper rod portion 43a has slipped out of the recess 38b and comes into the recess 38a, the bottom portions 38, 38 are returned to a gripped state by the biasing force of the torsion spring 34. Namely, as shown in FIG. 9, the left and right holding members 33a, 33b are returned to the biased state in a state that the upper rod portion 43a is fitted in the jointed forward recess 38A and the lower rod portion 43b is moved forward. Thereby, the lower rod portion 43b (operation lever 42) is set in the third speed zone 54a.

Next, an operation as to how the operation lever 42 in the center of the neutral zone 52a of FIG. 8 is shifted to the first speed zone 53a is described with reference to FIGS. 10 and 11. First, when the operation lever 42 is inclined rightward relative to the axis of the first shaft 32, the positioning rod 43 is inclined leftward. Accompanied by the rightward inclination of the operation lever 42, the bottom portion 38 of the left holding member 33a is moved leftward against a biasing force of the torsion spring 34 to open up the flat portions 38, 38. At this time, the stoppers 39 prevent the bottom portion 38 of the right holding member 33b from moving leftward in the (−Y) direction accompanied by the leftward movement of the left holding member 33a by the existence of the stoppers 39.

In this state, when the operation lever 42 is shifted rearward (to +X direction), as shown in FIG. 11, the positioning rod 43 is inclined forward (to −X direction). Then, the upper rod portion 43a slides along the peripheral end of the bottom portion 38 of the left holding member 33a in the (−X) direction from the center recess 38b toward the forward recess 38a. At this time, the lower rod portion 43b slides along the neutral groove 52 in the (−Y) direction and then slides along the left grove 53 along the (−X) direction to be positioned in the first speed zone 53a. During the above movement of the lower rod portion 43b, a biasing force of the torsion spring 34 is acted upon the left holding member 33a to return the left holding member 33a to the original middle position. Accordingly, the lower rod portion 43b slides along the left groove 53 toward the first speed zone 53a in pressing contact against a right wall of the left groove 53, and is finally fitted in the first speed zone 53a.

To sum it all up, when the operation lever 42 is shifted in the Y-Y direction, an operator is applied with the biasing force of the biasing member 34, because the operator must open up the holding members 33a, 33b. Likewise, when the operation lever 42 is shifted in the X-X direction, the operator is also given the biasing force, because, at this time also, the operator must first overcome the biasing force exerted on the upper rod portion 43a when the upper rod portion 43a moving from one recess to another recess, i.e., the movement of the upper rod portion cannot be done unless opening up the biased holding members 33a, 33b to shift the operation lever 42 in the X-X direction.

In summing up the above bias force supply mechanism, when the operation lever 42 moves along the Y-Y direction, it has to open either one of the holding members 33a, 33b in the Y-direction and when the operation lever 42 moves along the X-X direction, it also has to open either one or both of the holding members 33a, 33b in the Y-direction. As a result, whichever the way the operation lever 42 moves along, it has to overcome the biasing force exerted by the biasing member 34 acted upon the holding members 33a, 33b.

In addition, the shape of the recess 38a, 38b, 38c, is set such that it has substantially, but not limited to, a V-shape and when the recess on the peripheral end of the holding member 33a comes close to the other recess on the peripheral end of the holding member 33b, the pair of recesses 38a, 38b, 38c, form a substantially the four sided shape to encompass the upper rod portion 43a of the operation lever 42 therein. The shape of the recess, 38a, 38b, 38c, maybe a semi-circular or other n-sided polygon as long as the pair of recesses, 38a, 38b, 38c, when coming close to each other, encompass the upper rod portion 43a of the operation lever 42 and the movement of the operation lever 42 in the X-X direction can displace the holding member(s) 33a, 33b in the Y-direction.

Figure 12:
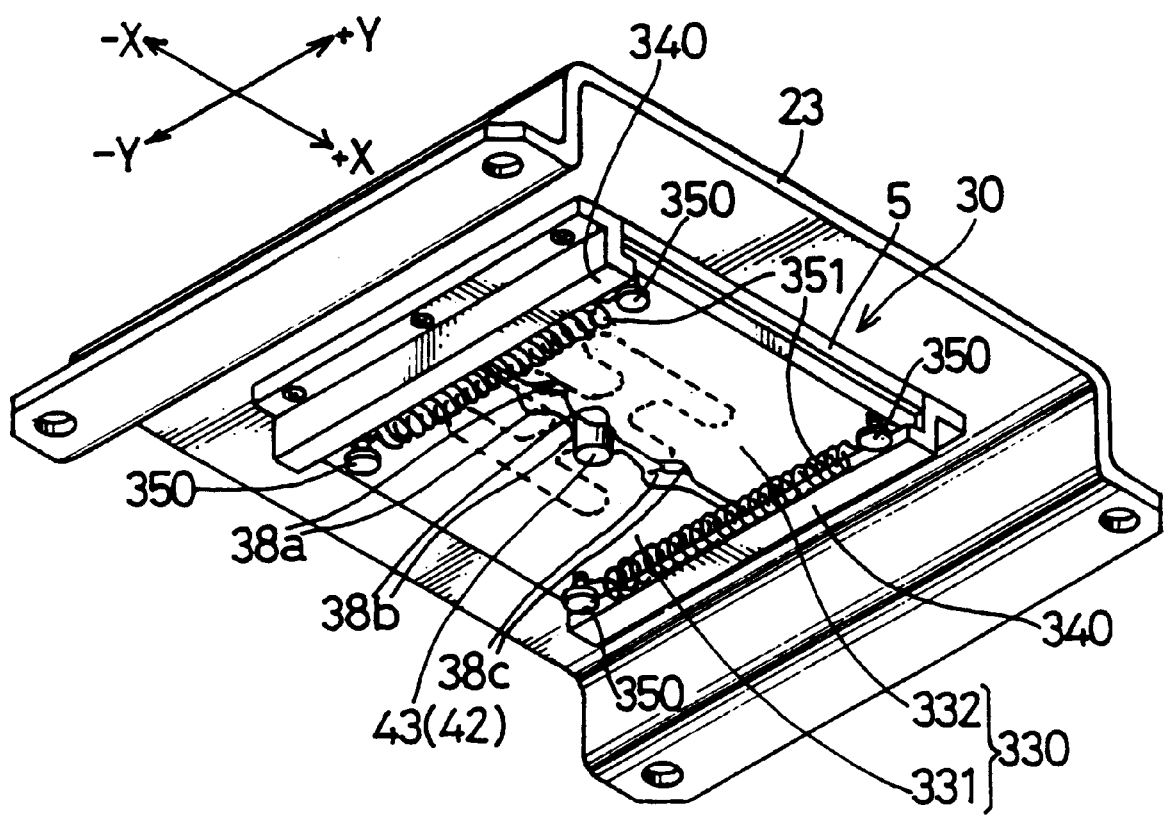
FIG. 12 is a perspective view of a bias force supply mechanism as an altered form when viewed from obliquely downward.

FIG. 12 is a perspective view of a bias force supply mechanism as an altered form when viewed from obliquely downward. In place of the holding member 33 which is pivotally supported about the axis of the first shaft 32 as shown in the embodiment, the bias force supply mechanism 30 of the altered form has a plate-like holding member 330.

The holding member 330 comprises a left holding plate 331, and a right holding plate 332. The left and right holding plates 331. 332 are slidable in the Y-Y direction of FIG. 12 (widthwise direction of the shift lever mechanism) in sliding contact with the positioning member 5 underneath the bottom plate 23 of the casing 2.

The left holding plate 331 (right holding plate 332) is formed with a forward recess 38a, a center recess 38b, and a rearward recess 38c in this order along the (+X) direction of FIG. 12 at a peripheral end thereof opposing to each other. The forward (center or rearward) recesses 38a, 38a (38b, 38b, or 38c, 38c) oppose to each other and define a jointed recess 38A (38B or 38C) when the left and right holding plates 331, 332 are biased toward each other, as will be described below.

The positioning rod 43 of the operation lever 42 which protrudes downward from the positioning member 5 is positioned at a held position of the left and right holding plates 331, 332 when the positioning rod 43 is fitted in the jointed recess 38A (38B, or 38C).

A pair of guide rails 340, 340 extending along the Y-Y direction are provided at opposite ends of the X-X direction on an underside surface of the bottom plate 23. The guide rails 340, 340 are adapted to slide the left and right holding plates 331, 332 along the Y-Y direction while restricting a movement thereof along the X-X direction. The left holding member 331 (right holding member 332) is horizontally slidable along the Y-Y direction in a state that the opposite ends in the X-X direction thereof are supported by the guide rails 340, 340.

A pair of engaging pins 350, 350 are provided at the opposite ends along the X-X direction at a left end corner of the underside surface of the left holding plate 331. Likewise, a pair of engaging pins 350, 350 are provided at the opposite ends along the X-X direction at a right end corner of the underside surface of the right holding plate 332. Coil springs 351 extending in the Y-Y direction are provided between the engaging pin 350 of the left holding plate 331 and the engaging pin 350 of the right holding plate 332, respectively. With this arrangement, the left and right holding plates 331, 332 are biased toward each other in the Y-Y direction, and the positioning rod 43 is held between the left and right holding plates 331, 332 by a biasing force of the pair of coil springs 351, 351.

In the bias force supply mechanism 30 having the above arrangement, the stopper 39 of the bias force supply mechanism 3 in the embodiment is not provided. Accordingly, when the operation lever 42 is manipulated in the Y-Y direction, the left and right holding plates 331, 332 slide in the same direction, i.e., in a direction opposite to the inclined direction of the operation lever 42. In this arrangement, the biasing force of the coil spring 351 is not acted upon the operation lever 42 when the operation lever 42 moves along the Y-Y direction.

Figure 13A:
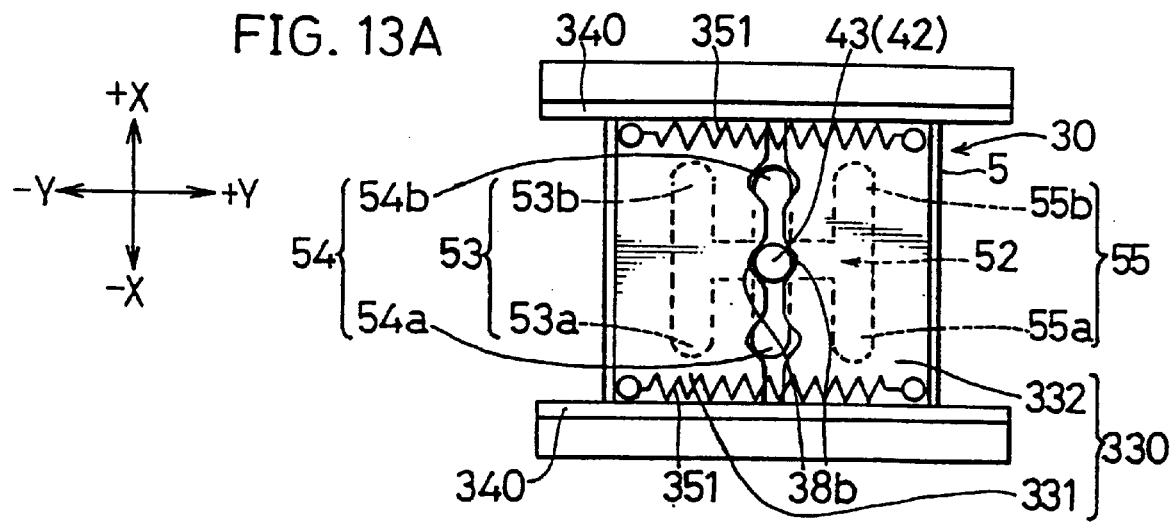
FIGS. 13A to 13C are explanatory diagrams showing an operation of the altered form of the bias force supply mechanism, FIG. 13A showing a state that the positioning rod is located in the middle of the neutral zone while being fitted in a center recess, FIG. 13B showing a state that the positioning rod has departed from the middle of the neutral zone and is on the way to a fourth speed zone, and FIG. 13C showing a state that the positioning rod is set in a second speed zone.
Figure 13B:
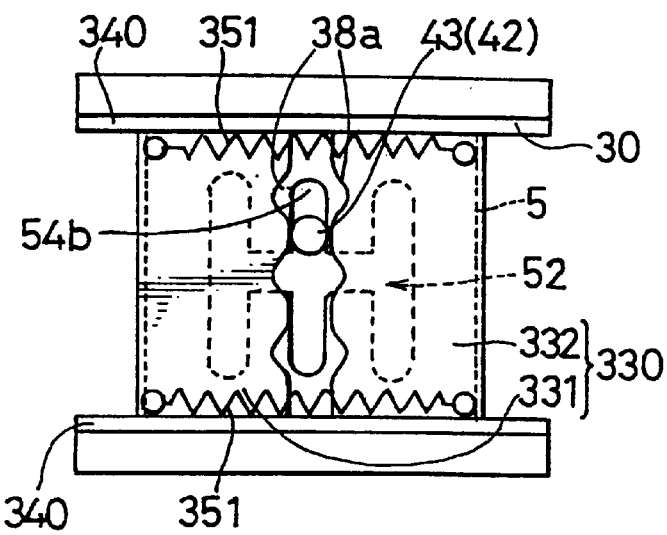
Figure 13C:
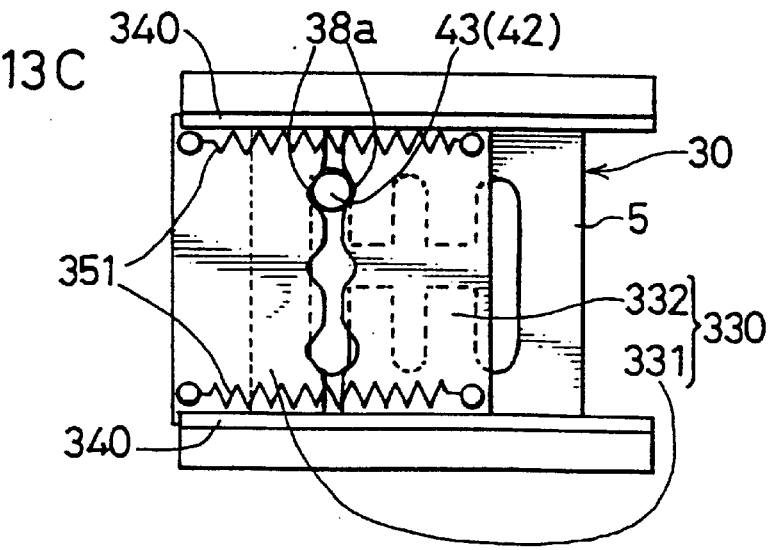

FIGS. 13A to 13C are diagrams for explaining an operation of the bias force supply mechanism 30. FIG. 13A shows a state that the positioning rod 43 is fitted in the jointed center recess 38B and positioned in the center of the neutral groove 52; FIG. 13B shows a state that the positioning rod 43 departs from the center of the neutral groove 52 and is on the way toward the fourth speed zone 54b; and FIG. 13C shows a state that the positioning rod 43 is set in the second speed zone 53b.

As shown in FIG. 13A, the positioning rod 43 is fitted in the jointed recess 38B of the left and right holding plates 331, 332 in a state that it is located in the center of the neutral groove 52 extending in the Y-Y direction. In this state, the positioning rod 43 is securely held between the left and right holding plates 331, 332 by a biasing force of the coil springs 351, 351.

In this state, the positioning rod 43 of the operation lever 42 is movable along the neutral groove 52 in the Y-Y direction while being smoothly guided by the guide rails 340, 340 without resisting against the biasing force of the coil springs 351, 351. However, when the positioning rod 43 is shifted in the X-X direction, the positioning rod 43 is required to be moved against the biasing force of the coil springs 351, 351 acting in the Y-Y direction to open up the left and right holding plates 331, 332 so as to be shifted from the jointed center recess 38B to the jointed forward recess 38A or the jointed rearward recess 38C.

As mentioned above, at the time when the positioning rod 43 is being shifted from the center recess 38B to the rearward recess 38C, as shown in e.g., FIG. 13B, the positioning rod 43 is required to be moved against the biasing force of the coil springs 351, 351. Accordingly, the operator can securely notice through the movement of the positioning rod 43 (i.e., the operation lever 42) that the positioning rod 43 is shifted from one recess to the other recess.

Further, when the positioning rod 43 is shifted leftward and then rearward from the state of e.g., FIG. 13A to the state of FIG. 13C, the positioning rod 43 is set to the second speed zone 53b. When the positioning rod 43 is fitted in the second speed zone 53b, the positioning rod 43 is held by the left and right holding plates 331, 332 in the jointed forward recess 38A in a state that these holding plates 331, 332 are located leftward from the original state of FIG. 13A.

In the bias force supply mechanism 30 having the above arrangement, when the positioning rod 43 is located in the neutral groove 52, the biasing force of the coil springs 351, 351 does not act upon the operation lever 42. Accordingly, the operation lever 42 in a so-called "neutral" state can be swiftly and smoothly moved in the Y-Y direction along the neutral zone 52a.

On the other hand, when the operation lever 42 is shifted to any of the first to the sixth speed zones 53a to 55b from the neutral zone 52a, the operator must exert a certain force which overcomes the biasing force of the coil springs 351, 351 to open up left and right holding plates 331, 332. Accordingly, the operator assuredly notices that the operation lever 42 is shifted to a certain speed zone from the neutral zone.

This invention can take the following forms.

(1) In the embodiment, the shift lever mechanism 1 which is used in a simulative running game machine is described as an example of the multi directional shift mechanism of this invention. However, this invention is not limited to the shift lever mechanism but also applicable to a speed changer of an automotive vehicle and various electric switches.

(2) In the embodiment, the support box 31 which supports the lever support member 41 through the second shaft 44 has a block shape. Alternatively, the support box may have a cylindrical shape, an oval shape, or a flat plate-like shape.

(3) In this embodiment, the torsion spring 34 is a biasing member for the holding member 33. By setting the length of the torsion spring at a reasonable value, a variation of the biasing force due to expansion and compression of the torsion spring can be suppressed as much as possible. Thereby, the operability of the operation lever can be improved. Alternatively, the biasing member may be a compression spring, a tension spring, a plate spring or its equivalent.

(4) In the aforementioned embodiment, a micro switch is used as the detector for detecting the speed zone set by the operation lever. Alternatively, the detector may be a light sensor, or various position sensors.

(5) In the above embodiment, the slider 61 is a movable member for detecting the position of the operation lever in association with the movement of the operation lever with a certain time lag. The rectangular hole 61a of the slider 61 is formed such that the movement of the operation lever is transmitted to the slider with a certain time lag behind the fore and aft movement of the operation lever. This arrangement simulatively produces a speed changing operation of an automotive vehicle. Similarly, a certain time lag may be produced from a sideways movement of the operation lever 42. In this case, the support box 31 may be formed with a vertically long support hole so that the second shaft 44 supports the support box 31 through the vertically long hole.

(6) In the foregoing embodiment, the positioning rod 43 is fitted in the guide groove 51 of the positioning member 5. In place of this arrangement, the operation lever 42 may be directly fitted in the guide groove 51. In this case, the positioning member 5 is provided on the side of the top plate 22 of the casing 2.

(7) In the embodiment, the operation lever 42 is operable forward/backward and leftward/rightward. The operation lever 42 may be also vertically operable. Thereby, the movement of the shift lever mechanism can be versatile, and an operator can enjoy the manipulation of the game machine in a wide range.

(8) In the above embodiment, the operation lever 42 is pivotally supported about the axis of the first shaft 32 along the Y-Y direction, and is also pivotally supported about the axis of the second shaft 44 along the X-X direction. This invention is not limited to the dual-axis system. Alternatively, the shift lever mechanism may be such that a spherical portion is formed in an intermediate portion of the operation lever and the spherical portion may be supported by a support member having a curved surface.

(9) The stopper 39 is provided in the bias force supply mechanism 3 of the embodiment, and is not provided in the bias force supply mechanism 30 of the altered arrangement. Conversely, the stopper 39 of the bias force supply mechanism 3 may be omitted, and a stopper similar to the stopper 39 may be provided in the bias force supply mechanism 30.

(10) In the bias force supply mechanism 30, the holding member 330 is provided on the lower side of the bottom plate 23. Alternatively, the holding member 330 may be provided on the upper side of the bottom plate 23 or may be provided on the upper side of the top plate 22.

(11) In the embodiment, the recesses 38a, 38a, 38b, 38b, and 38c, 38c of the holding member 33 (330) are formed at such a position as to oppose to each other. Alternatively, the relative position of the corresponding recess may be displaced from each other.

(12) In the embodiment, the forward portion and the rearward portion of the guide groove 53 (54 or 55) of the positioning member 5 are aligned in the X-X direction with the neutral groove 52 interposed therebetween. Alternatively, the forward portion and the rearward portion may be displaced from each other relative to the neutral groove 52 (Y-Y direction).

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A multi directional shift mechanism comprising:
   an operation lever which is movable in a first direction and a second direction, intersecting the first direction;
   a guide member for guiding the operation lever along a guiding passage formed on the guide member, the guiding passage including a neutral path extending along the second direction and branch paths, extending along the first direction, stemmed out from the neutral path at a plurality of certain positions;

a pair of holding members, each formed with a plurality of recesses at a peripheral end thereof for receiving the operation lever in the recess to hold the operation lever at positions corresponding to the branch paths; and a biasing member for biasing the pair of holding members in such a manner that the peripheral ends of the respective holding members come close toward each other.

2. The multi directional shift mechanism as defined in claim 1, further comprising a detector for detecting the position of the operation lever along the guiding passage.

3. The multi directional shift mechanism as defined in claim 1, wherein the recess formed on the peripheral end of one of the holding members form a substantially n-sided polygon with the recess formed on the periphery of the other one of the pair of holding members when the pair of holding members are biased toward each other by the biasing member.

4. The multi directional shift mechanism as defined in claim 3, wherein the n-sided polygon is substantially four sided.

5. The multi directional shift mechanism as defined in claim 1, wherein the first direction is orthogonal to the second direction.

6. The multi directional shift mechanism as defined in claim 1, wherein the biasing member biases the pair of holding members in such a manner that the peripheral ends of the holding members move substantially along the second direction.

7. The multi directional shift mechanism as defined in claim 1, wherein the biasing member and the holding members are so designed that when the operation lever is moved along the second direction, the operation lever moves one of the holding members to the second direction by overcoming the biasing force exerted by the biasing member.

8. The multi directional shift mechanism as defined in claim 7, wherein the biasing member and the holding members are so designed that when the operation lever is moved along the first direction, the operation lever moves one or both of the holding members apart from each other substantially along the second direction by overcoming the biasing force exerted by the biasing member.

9. The multi directional shift mechanism as defined in claim 1, wherein the biasing member includes a torsion spring.

10. The multi directional shift mechanism as defined in claim 1, wherein the biasing member includes a coil spring.

11. The multi directional shift mechanism as defined in claim 1, wherein the operation lever includes a grip end and an opposite end, the holding members hold a portion of the operation lever between the grip end and the opposite end and the guide member guiding a portion of the operation lever substantially proximity to the opposite end.

12. A multi directional shift mechanism comprising:

a support member having a first shaft and a second shaft perpendicularly intersecting the first shaft and pivotable around the first shaft;

an operation lever pivotable around the second shaft;

a guide member engageable with the operation lever for guiding the operation lever from a plurality of set positions along a neutral path extending along the second shaft to a first direction to position the operation lever at a certain position;

a pair of holding members pivotally provided around the first shaft, each of the holding members having a peripheral end formed with a plurality of recesses at positions corresponding to the plurality of set positions, the peripheral ends of the holding members opposing toward each other; and a biasing member for biasing the holding members in such a manner that the peripheral ends of the holding members come close toward each other.

13. The multi directional shift mechanism as defined in claim 12, further comprising:

a stopper for prohibiting the pivotal movements of the holding members when the operation lever is set in the neutral path; and a detector for detecting the operation lever at the set positions.

14. The multi directional shift mechanism as defined in claim 12, wherein the biasing member is a torsion spring for biasing the holding members to pivot around the first shaft.

15. The multi directional shift mechanism as defined in claim 14, wherein the torsion spring is wound around the first shaft.

16. The multi directional shift mechanism as defined in claim 12, wherein the biasing member includes a coil spring.

17. The multi directional shift mechanism as defined in claim 16, wherein the coil spring is stretched along the second direction to bias both holding members toward each other.

18. The multi directional shift mechanism as defined in claim 12, further comprising a movable member for detecting a position of the operation lever in association therewith and the movable member is so set as to form a play at an engaging portion between the movable member and the operation lever.

19. The multi directional shift mechanism as defined in claim 12, wherein the shape of the recess formed on the peripheral end of the holding member is substantially a V shape and the V-shaped recess is opened towards a second direction.

* * * * *